United States Patent [19]

Burnham

[11] Patent Number: 4,685,788
[45] Date of Patent: Aug. 11, 1987

[54] FILM REGISTRATION APPARATUS

[75] Inventor: William L. Burnham, Leroy, N.Y.

[73] Assignee: Eastman Kodak Company, Rochester, N.Y.

[21] Appl. No.: 880,533

[22] Filed: Jun. 30, 1986

[51] Int. Cl.⁴ .............................................. G03B 1/00
[52] U.S. Cl. .................................. 354/121; 354/206; 354/213
[58] Field of Search ....................... 354/121, 206, 213

[56] References Cited

U.S. PATENT DOCUMENTS

| | | | |
|---|---|---|---|
| 3,852,784 | 12/1984 | Stoneham | 354/213 X |
| 3,999,199 | 12/1976 | Beach | 354/213 X |
| 4,309,096 | 1/1982 | Sethi | 354/121 |
| 4,361,387 | 11/1982 | Cloutier | 354/121 X |
| 4,449,806 | 5/1984 | Wong et al. | |
| 4,492,443 | 1/1985 | Spencer et al. | 354/121 |
| 4,561,743 | 12/1985 | Benson | 354/121 |
| 4,602,859 | 7/1986 | Chan | 354/121 |

Primary Examiner—L. T. Hix
Assistant Examiner—Brian W. Brown
Attorney, Agent, or Firm—Robert R. Randall

[57] ABSTRACT

A camera for use with a photographic element having a plurality of the exposure frames each having a registration perforation arranged in a predetermined relationship one with each frame. The camera is provided with an improved registration or metering means which includes a fixed element extending into the film plane and disposed in the camera adjacent the exposure aperture in a similar predetermined relationship therewith as the registration perforations are to the exposure frames of the photographic element or film. A movable element adjacent the fixed element is arranged to engage the photographic element to move the photographic element out of the predetermined plane to disengage the registration perforation from the fixed element whereby the film moving means of the camera can move the next frame of the film to the exposure aperture where it is engaged at least by the fixed element.

7 Claims, 7 Drawing Figures

FIG. 3
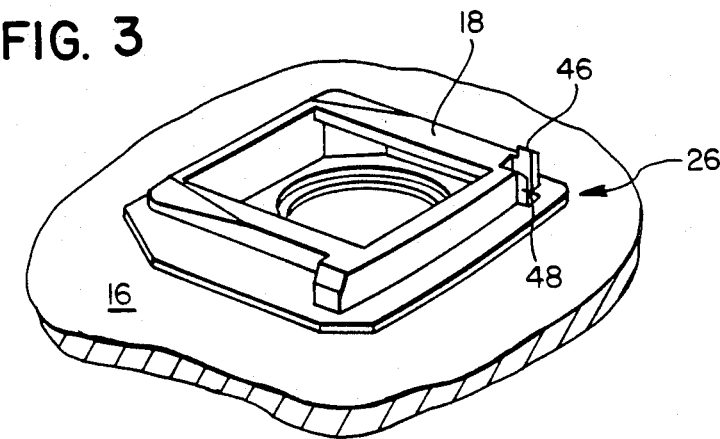
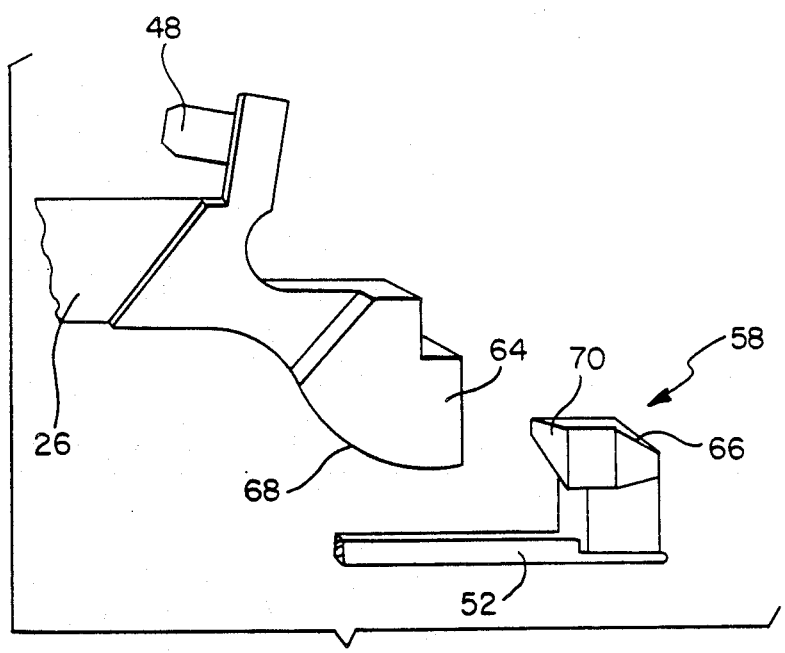
FIG. 4

FILM REGISTRATION APPARATUS

BACKGROUND OF THE INVENTION

1. Field of the Invention

The present invention relates to film registration apparatus for a camera which is intended for use with film having a plurality of exposure regions and corresponding metering notches or perforations arranged in a predetermined relationship, one with each frame.

2. Description of the Prior Art

Film and camera systems are known wherein the film is provided with a plurality of uniformly spaced exposure regions, some of which are defined by previously exposed frames surrounding the exposure region. Each of the exposure regions is associated with a corresponding adjacent metering notch or perforation which is arranged in a predetermined relationship, one with each exposure region. Cameras for use with such films are provided with a metering pin or pawl which is arranged to engage the metering notch to precisely locate the exposure region with respect to the exposure aperture of the camera. Examples of such film and camera systems include 110 film and cameras, as well as disk film and cameras. These film and camera systems have typically used a reciprocating pin, or pawl, which is movable perpendicular to the plane of the film and is arranged to extend into that plane to engage the perforation or notch in the film to accurately locate the exposure region with respect to the camera lens. The reciprocating pin must be sufficiently strong to engage and hold the film, which may be moving at the time the pin engages the perforation. The pin must also be movable into and out of the film plane and yet be accurately located with respect to the camera exposure axis so as to accurately position the film exposure frame. Still further, it has been found that the movement of the pin must be relatively fast to engage each successive perforation as the film is advanced, sometimes by motorized camera drives, to avoid skipping frames of the film.

In other film and camera systems, e.g. 35 mm, the image areas of the film are not pre-exposed. Nevertheless, accurate registration of the image areas or exposure frames is necessary to prevent overlapping exposures if they are too close, or a waste of film if they are too far apart.

It has been found that the strength and accuracy necessary for the metering pins or devices in such cameras increases the cost and complexity of the cameras. This can be reduced by the improved metering pin construction of the present invention.

SUMMARY OF THE INVENTION

Accordingly, the present invention provides a camera for use with a photographic element having a plurality of the exposure frames each having a registration perforation arranged in a predetermined relationship one with each frame. The camera is provided with a registration or metering means which is both simpler and more accurate than those provided with prior art cameras.

According to one aspect of the present invention, a camera is provided having an exposure aperture for exposing a photographic element of the type above-described. The camera has means for moving each frame of the photographic element to the exposure aperture, means for registering each frame of the photographic element at the exposure aperture, and means for holding the photographic element in a predetermined plane at the exposure aperture. The improvement in the frame registering means includes a fixed element disposed in the camera adjacent the exposure aperture and in a similar predetermined relationship therewith as the registration perforations are to the exposure frames of the photographic element or film. The fixed element is arranged to extend into the predetermined plane of the film and to engage the registration perforation to hold the frame in registration with the exposure aperture of the camera. A movable element adjacent the fixed element is arranged to engage the photographic element to move the photographic element out of the predetermined plane to disengage the registration perforation from the fixed element whereby the film moving means of the camera can move the next frame of the film to the exposure aperture where it is engaged at least by the fixed element.

According to another aspect of the present invention the camera is provided with means for normally biasing the movable element out of the plane of the film and to move the movable element to move the film out of the predetermined plane after the frame is exposed and before the next frame of the film is moved to the exposure aperture.

According to yet another aspect of the invention, the movable element is normally biased into the plane of the film and the means for moving the movable element is arranged to move it out of the plane before the frame is exposed and to return it into the plane to move the film out of the predetermined plane after the frame is exposed and before the next frame of the film is moved to the exposure aperture.

Various means for practicing the invention and other features and advantages thereof will be apparent from the following detailed description of the illustrative preferred embodiments of the invention, reference being made to the accompanying drawings.

BRIEF DESCRIPTION OF THE DRAWINGS

FIG. 3 is an enlarged detail of the exposure aperture of the camera illustrated in FIGS. 1 and 2;

FIG. 4 is an enlarged detail of the demetering portion of the present camera.

DESCRIPTION OF THE ILLUSTRATIVE PREFERRED EMBODIMENT

Although the present invention is applicable to various kinds of cameras, for example, disc cameras and 110 cameras, the illustrative embodiment is directed to a disc camera of the type disclosed in copending U.S. patent application Ser. No. 748,533, entitled A MOTOR DRIVEN DISC CAMERA which was filed on June 24, 1985 in the names of Cloutier et al. The disk film cartridge used in such cameras is disclosed in U.S. Pat. No. 4,309,096, entitled FILM CARTRIDGE ASSEMBLY WITH PRESSURE PLATE which issued in the name of G. S. Sethi.

Figure 1:
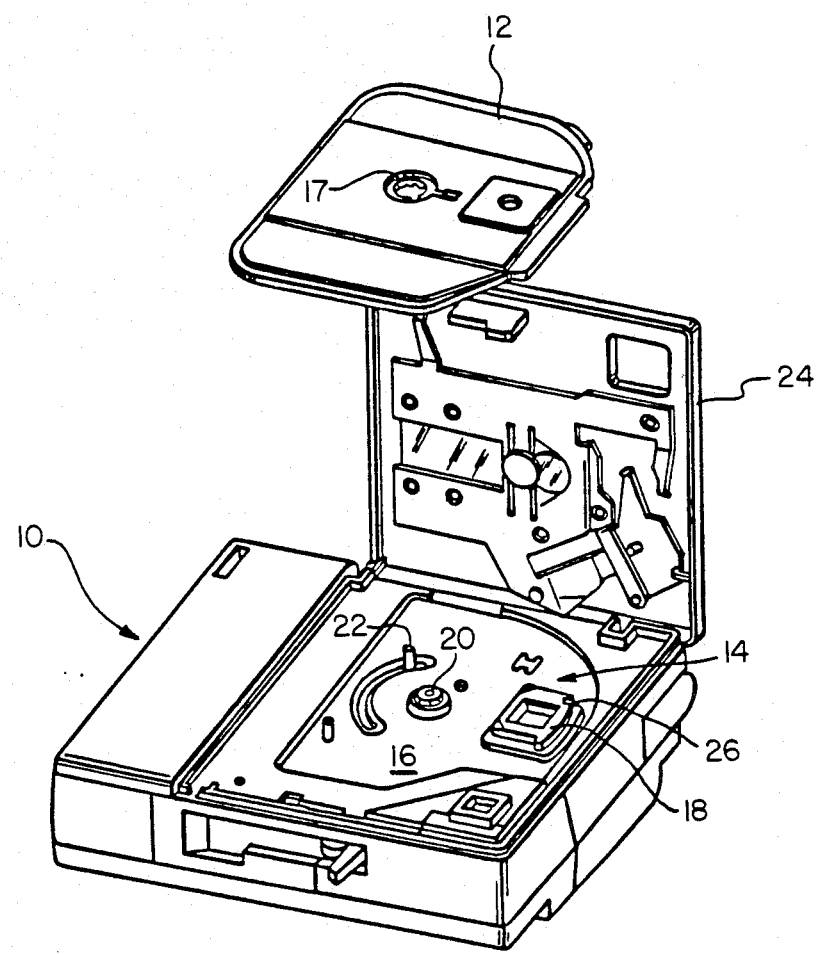
FIG. 1 is a rear perspective view of a camera incorporating the present invention.
Figure 2:
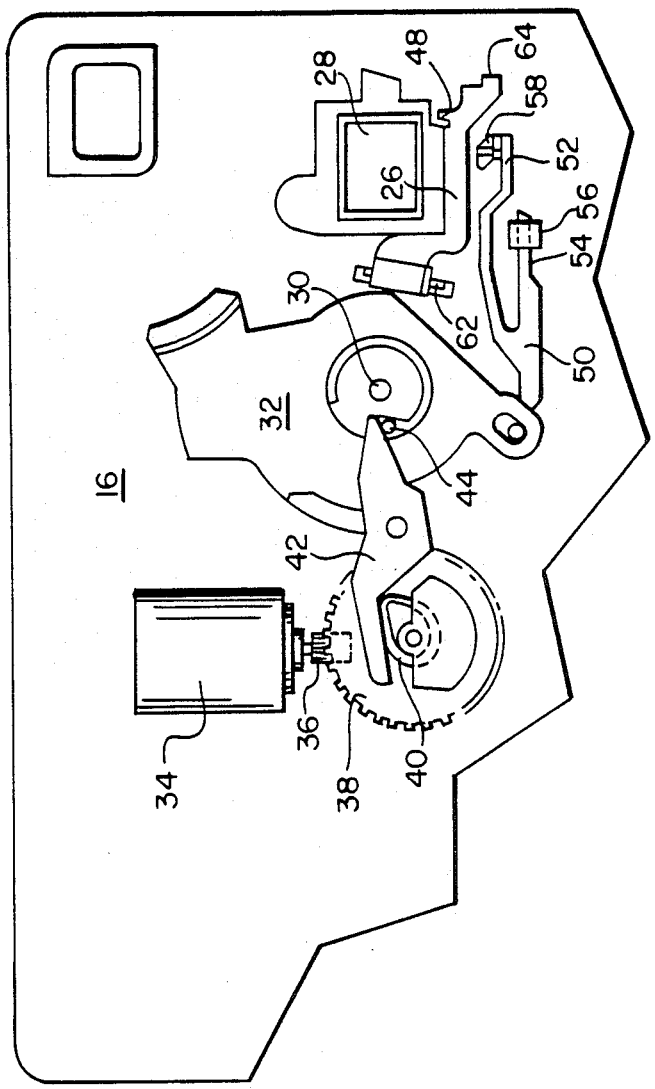
FIG. 2 is a front schematic view of the camera illustrated in FIG. 1 with portions removed to reveal the portion of the operating mechanism relating to the present invention.

Referring now to the drawings and in particular to FIGS. 1 and 2, there is shown a rear perspective view of a camera 10, along with a film cartridge 12 which is useable therein. In FIG. 1 the rear loading door 24 of the camera is illustrated in its open position with the film cartridge 12 disposed above a cartridge chamber 14, in which the front wall of the cartridge lies adjacent the rear surface of an intermediate camera wall 16, located rearwardly of the major components of the camera mechanism. According to the teachings of the foregoing Sethi patent, the film cartridge comprises a generally flat light-tight plastic housing enclosing a rotatable disk of film (not shown) which is provided with a central hub 17 that is accessible from the exterior of the housing. As taught in the Sethi patent, the film disk is provided with a plurality of uniformly spaced exposure regions defined by previously exposing the surrounding portion of the film. Each of the exposure regions is associated with a corresponding adjacent metering notch located along the edge of the film disk in a clockwise direction from the respective exposure region. An exposure window is provided in the front wall of the cartridge housing, and the rear wall of the cartridge includes a pressure plate member in alignment with the exposure window in the front wall. When the cartridge is loaded into the receiving chamber of the camera, a film support frame member 18 is received in the exposure window of the cartridge. A camera drive hub member 20 engages the hub of the film disk, and a slide operating pin 22 engages the cover slide in the front surface of the cartridge. Closing the camera door 24 causes spring members thereon to seat the cartridge against the intermediate wall 16 and brings a pressure applying member into alignment with the cartridge pressure plate member. Latching the door causes the slide operating pin 22 to move the cover slide out of alignment with the exposure window so that an exposure region of the film disk can be supported against the film support frame member 18. When the cover slide is open, a metering pawl tooth 26 extends through the exposure window of the cartridge to engage the metering notch in the periphery of the film disk when each exposure region is properly aligned with the lens of the camera to control the incremental rotation of the disk.

Referring now to the front view of the camera mechanism in FIG. 2, the front surface of the intermediate camera wall 16 provides the main mounting surface for the camera mechanism components. As disclosed in the above-identified Cloutier et al. application, the lens assembly 28 and the film support frame member 18 (FIGS. 1 and 3) are constructed so as to assure the requisite film-to-lens location and are mounted through an opening in the intermediate camera wall 16. The camera hub or film drive member 20 extends through an opening in the intermediate camera wall and is provided with a forwardly extending coaxial shaft 30. A mechanism driving member 32 is mounted on the shaft 30 of the film drive hub and is arranged for reciprocating pivotal motion in opposite first and second directions thereabout. The driving member is driven by a motor 34 through a pinion 36 and gear 38 which is provided with a cam 40 which drives a first end of a reciprocating lever member 42, the second end of which engages a boss 44 on driving member 32 to provide the reciprocating motion thereto. As disclosed in the copending Cloutier et al. application, the driving member 32 provides a plurality of camera operating functions, only one of which, the demetering function, is relevant to the present invention.

Referring now to FIG. 3, wherein an enlarged view of the film support frame member 18 is illustrated, it will be seen that the metering pawl 26 comprises a stationary or fixed element or tooth portion 46 and a movable element or tooth portion 48 disposed in the same relationship to the exposure aperture of the camera as the relationship of the notch in the film disk bears to the exposure frame of the film. In the preferred embodiment, the combined cross-sectional area of the stationary and the movable tooth portions are less than the area of each of the metering notches in the film disk.

The movable element or tooth portion 48 is driven by the driving member 32 via demetering lever 50 which is connected at one end to the driving member 32. The opposite end of demetering lever 50 is bifurcated into a cam leg 52 and a guide leg 54. The guide leg 54 extends in sliding engagement through a locating clip 56 on the intermediate camera wall 16 to assure the linear motion of the demetering lever during operation of the driving member. The cam leg 52 is flexible to permit lateral motion thereof and is provided at its end with a cam member 58. The metering pawl 26 is disposed along the lower edge of the lens assembly 28 and is pivotally supported by an axel 62 at one end thereof. The movable tooth portion of the metering pawl 26 is carried at the opposite end of the metering pawl. The metering pawl and the movable tooth portion are spring-loaded in the film-engaging position by a spring, not shown. Referring to FIG. 4, the cam member 58 is provided with a pair of cam surfaces that cooperate with a lifting cam 64 at the tooth end of the metering pawl 26. The first cam surface 66 engages the side wall 68 of the lifting cam 64 and deflects the cam member 58 around the lifting cam during initial movement of the demetering lever, to the right in FIG. 2. After the cam member 58 of the demetering lever has passed to the right of the lifting cam 64, the flexible nature of the cam leg causes the cam member to snap into alignment with the lifting cam 64. The second cam surface 70 of the cam member 58 is arranged, as the demetering lever 52 is moved to the left, to slide under the lifting cam 64 and to lift it over cam member 58 and, in the process, remove the movable tooth portion 48 attached to the metering pawl 26, from engagement with the metering notch in the periphery of the film disk, preparatory to the film disk being advanced by the film drive hub.

Figure 5:
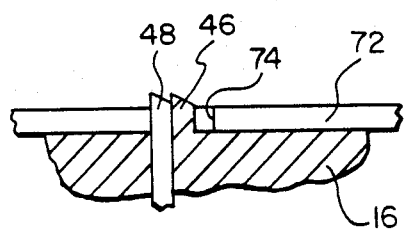
FIGS. 5-7 are a sequential schematic illustration of the operation of the present invention.
Figure 6:
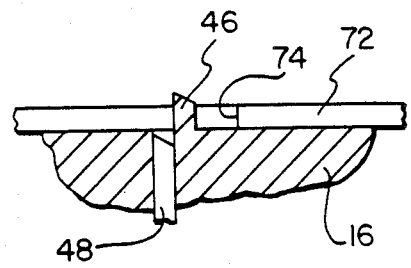
Figure 7:
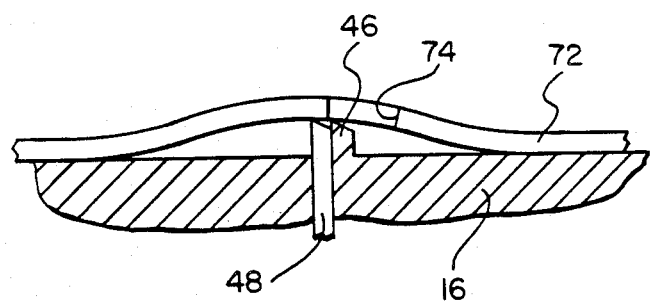

Referring now to FIGS. 5-7, the metering system of the present invention is illustrated. In FIG. 5 the film disk 72, having a metering notch 74 in the periphery thereof, is engaged by both the stationary tooth portion 46 and the movable tooth portion 48 during the exposure of the respective exposure region of the film. After the completion of the exposure the camera drive motor 34 is actuated moving the driving member first in the counterclockwise direction, moving the cam member 58 to the right in FIGS. 2 and 4 until it passes around the end of lifting cam 64 on the metering pawl 26. As the motor continues to rotate, the cam 40 and lever 42 permit the driving member 32 to be returned in the clockwise direction under the influence of a spring, not shown, pulling the cam member 58 under the lifting cam 64 to remove the movable tooth portion 48 from the film notch. At the same time a driving force is imparted to the film drive hub 20 causing the edge of the film notch 74 to move into engagement with the surface of the stationary tooth portion 46, as illustrated in FIG.

6. As the cam member 58 is pulled beyond the lifting cam 64 the metering pawl 26 is released and, under the influence of the spring, not shown, the movable tooth portion 48 is again moved into the film plane, lifting the film above the end of the stationary tooth portion 46 for continued movement to the next metering notch, not shown, registering the next succeeding film exposure plane with the camera exposure aperture.

It will be appreciated that with the metering arrangement of the present invention that the accuracy of the location of the metering pin is simplified because the stationary tooth portion 46 may be molded integrally with the film support frame member 18 which also is accurately aligned with the camera lens assembly 28. Moreover, since the accurately aligned stationary tooth portion 46 need not be moved for the functioning of the metering operation, it may be strengthened beyond that possible with totally movable metering pins of the prior art. Still further since the stationary tooth portion 46 is always within the plane of the film disk and regardless of whether the movable tooth portion is in or out of the plane of the film disk, a portion of the metering pawl will always be within the plane of the film disk to catch the next succeeding metering notch, thereby reducing the possiblity of skipping frames of the film during advancement. Inasmuch as the movable tooth portion 48 is engaged with the film notch 74 during exposure, the thickness of the movable tooth portion 48 must be accurately controlled so that, in combination with the dimensions of the stationary tooth portion 46, the movable and stationary tooth portions satisfactorily register the film exposure region with respect to the camera exposure aperture.

ALTERNATIVE EMBODIMENTS

With a minor variation in the camera operating mechanism the metering device of the present invention can be modified to eliminate the requirement of any precision in the movable tooth portion 48 by arranging the mechanism to normally bias the movable tooth portion out of the plane of the photographic element. Thus, the operational sequence is that the film metering notch 74 is in contact with the stationary tooth element 46 during exposure, as illustrated in FIG. 6. After exposure the movable tooth member is momentarily moved into the plane of the film, long enough to disengage the notch 74 from the stationary tooth portion 46 and is thereafter moved to the position illustrated in FIG. 6.

In yet another alternative embodiment the demetering mechanism can be arranged so that the movable tooth portion 48 is removed from the notch 74 just prior to the exposure of the film, permitting the edge of the notch to engage the stationary tooth portion 46 during exposure. Thereafter the movable portion 48 is moved into the film plane to disengage the film notch from the stationary tooth 46 for advancement. The movable tooth portion remains in the plane of the film until the next notch is engaged and until just prior to the next film exposure.

In each of these last alternative embodiments it is possible to provide a metering structure whereby the critical dimensions need be formed only in the stationary tooth portion when the film support frame member is manufactured, substantially reducing the cost and complexity of the metering mechanism.

Still further, although the present invention has been described specifically with respect to a disk film and camera system, it is equally applicable to other film and camera systems utilizing a metering notch or perforation located in a predetermined relationship to a film exposure plane.

It will be appreciated that, while the preferred embodiment has been described with respect to a film having a pre-flashed exposure frame and a single metering perforation associated with each exposure frame, the invention can be used equally satisfactorily with cameras and film which do not use preflashed exposure frames, e.g. 35 mm systems. With such systems the metering operating mechanism would be modified to take into account the fact that several perforations in the film are associated with each exposure frame. The metering pawl operating mechanism would have to "count" perforations to assure that the right perforation were engaged for registration purposes. The "correct" perforation for metering in a camera/film system using a plurality of perforations along a single exposure frame would depend upon the position in the camera chosen to locate the metering pawl with respect to the exposure aperture of the camera and would lend itself to camera design flexibility.

The invention has been described with reference to specific embodiments and variations, but it should be apparent that other modifications and variations can be made within the spirit and scope of the invention, which is defined by the following claims.

What is claimed is:

1. In a camera having an exposure aperture for exposing a photographic element, said photographic element having a plurality of exposure frames and a plurality of registration perforations arranged in a predetermined relationship one with each frame, means for moving each frame of said photographic element to said exposure aperture, means for registering each frame of said photographic element at said exposure aperture, and means for holding said photographic element in a predetermined plane at said exposure aperture, the improvement wherein:

said frame registering means includes a fixed element disposed in said camera adjacent said exposure aperture and in a similar predetermined relationship therewith as said registration perforations are to said exposure frames of said photographic element, said fixed element arranged to extend into the predetermined plane of the photographic element and to engage said registration perforation to hold said frame in registration with said exposure aperture, and a movable element arranged to engage the photographic element to move said photographic element out of said predetermined plane to disengage said registration perforation from said fixed element whereby said means for moving said photographic element can move the next frame of said photographic element to said exposure aperture.

2. The invention according to claim 1 wherein said fixed element is a pin member having an axis extending perpendicular to said plane of the photographic element and said movable element is arranged to move parallel to the axis of said pin member.

3. The invention according to claim 1 wherein the cross sectional area of said fixed element is less than the cross sectional area of said perforations in said photographic element.

4. The invention according to claim 2 including means for moving said movable element perpendicular to said plane of the photographic element.

5. The invention according to claim 4 including means for normally biasing said movable element out of said plane of the photographic element, and said means for moving said movable element is arranged to move said movable element to move said photographic element out of said predetermined plane after said frame is exposed and before the next frame of said photographic element is moved to said exposure aperture.

6. The invention according to claim 4 including means for normally biasing said movable element into said plane of the photographic element, and said means for moving said movable element is arranged to move said movable element out of said plane before said frame is exposed and to return said movable element into said plane to move said photographic element out of said predetermined plane after said frame is exposed and before the next frame of said photographic element is moved to said exposure aperture.

7. The invention according to claim 6 wherein the combined cross-sectional area of said fixed element and said movable element is less than the cross-sectional area of said perforations in said photographic element.

* * * * *